(12) United States Patent
Jonasson

(10) Patent No.: US 8,761,726 B2
(45) Date of Patent: Jun. 24, 2014

(54) METHODS OF PROVIDING COMMUNICATION SERVICES INCLUDING ACCOUNT BALANCE SHARING AND RELATED CHARGING SYSTEMS

(75) Inventor: Kaj Jonasson, Ronneby (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 152 days.

(21) Appl. No.: 13/333,261

(22) Filed: Dec. 21, 2011

(65) Prior Publication Data

US 2013/0165071 A1    Jun. 27, 2013

(51) Int. Cl.
*H04M 11/00* (2006.01)
(52) U.S. Cl.
USPC .......................................................... 455/406
(58) Field of Classification Search
USPC ................................................. 455/405–408
See application file for complete search history.

(56) References Cited

U.S. PATENT DOCUMENTS

| | | | |
|---|---|---|---|
| 7,881,697 B2 * | 2/2011 | Baker et al. ................... | 455/405 |
| 8,462,923 B2 * | 6/2013 | Krishnamoorthy et al. ......................... | 379/114.01 |
| 2008/0119162 A1 * | 5/2008 | Sivalingam et al. .......... | 455/408 |
| 2010/0075630 A1 | 3/2010 | Tillitt et al. | |
| 2011/0225281 A1 | 9/2011 | Riley et al. | |
| 2013/0017803 A1 * | 1/2013 | Li et al. ......................... | 455/406 |

FOREIGN PATENT DOCUMENTS

| | | |
|---|---|---|
| WO | WO 98/21874 A1 | 5/1998 |
| WO | WO 98/56160 A1 | 12/1998 |
| WO | WO 99/18713 A1 | 4/1999 |
| WO | WO 2008/063831 A1 | 5/2008 |
| WO | WO 2010/126466 | 11/2010 |
| WO | WO 2011/002450 A1 | 1/2011 |

OTHER PUBLICATIONS

3GPP TS 32.299 v9.4.0, $3^{rd}$ Generation Partnership Project, "Technical Specification Group Services and System Aspects; Telecommunication management; Charging management; Diameter charging applications (Release 9)", Jun. 2010, 148 pages.
International Search Report and Written Opinion Corresponding to International Application No. PCT/SE2012/051281; Date of Mailing: Sep. 16, 2013; 13 Pages.

* cited by examiner

*Primary Examiner* — Brandon Miller
(74) *Attorney, Agent, or Firm* — Myers Bigel Sibley & Sajovec, P.A.

(57) ABSTRACT

Charging control may be provided for a charging controlled service accessed by a terminal in a communication network using a first account having a first account balance associated with the terminal. A first request may be received for a charging reservation relating to the first account balance associated with the terminal. Responsive to the first request for a charging reservation and responsive to a first status of the first account balance, a first consumer deduction amount may be reserved from the first account balance to allow the charging controlled service for the terminal. While allowing the charging controlled service for the terminal based on the first consumer deduction amount reserved from the first account balance, a replenishment request directed to a second account balance may be generated responsive to a second status of the first account balance. Related network nodes are also discussed.

22 Claims, 9 Drawing Sheets

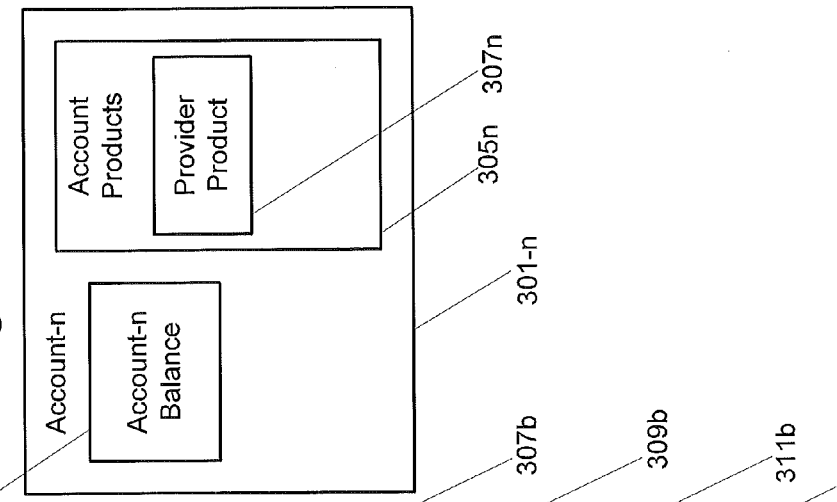
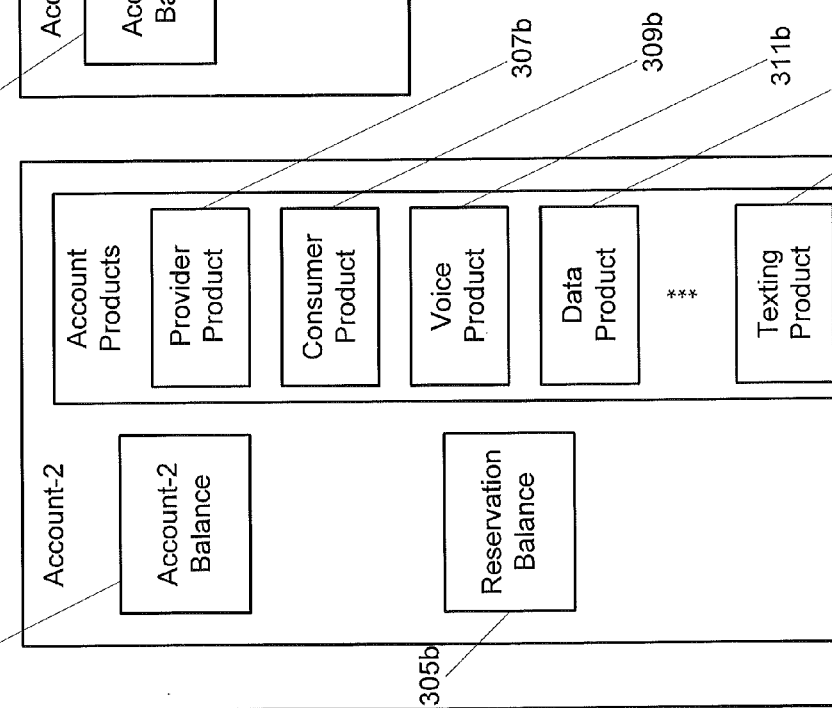
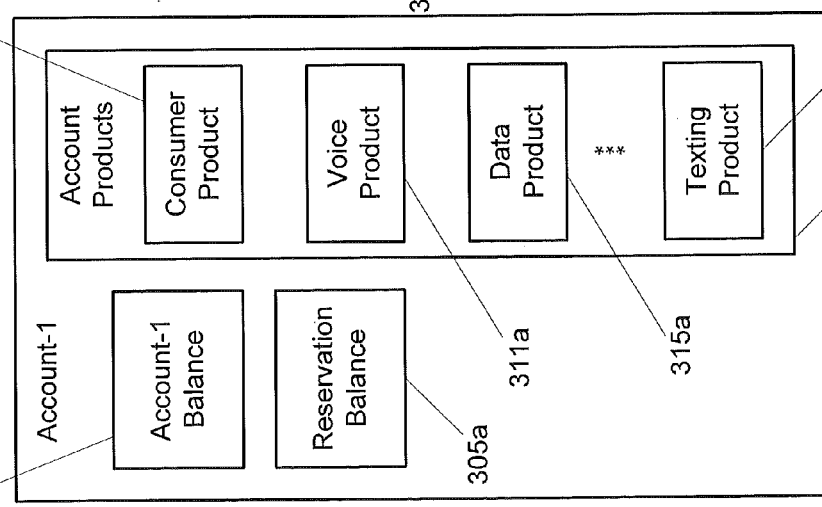

METHODS OF PROVIDING COMMUNICATION SERVICES INCLUDING ACCOUNT BALANCE SHARING AND RELATED CHARGING SYSTEMS

TECHNICAL FIELD

The present disclosure is directed to communications and, more particularly, to charging systems for communications and related methods.

BACKGROUND

In a typical cellular radio system, wireless terminals (also referred to as user equipment unit nodes, UEs, and/or mobile stations) communicate via a radio access network (RAN) with one or more core networks. The RAN covers a geographical area which is divided into cell areas, with each cell area being served by a radio base station (also referred to as a RAN node, a "NodeB", and/or enhanced NodeB "eNodeB"). A cell area is a geographical area where radio coverage is provided by the base station equipment at a base station site. The base stations communicate through radio communication channels with UEs within range of the base stations.

In cellular radio systems, charging systems may be used to control billing and/or access for wireless terminals communicating with the RAN based on respective subscriptions/plans for the wireless terminals. With a billing plan for a wireless terminal, for example, the charging system may maintain a balance based on consumption of communication services by the wireless terminal, and periodic bills for the wireless terminal may be based on the consumption of communication services as determined using the balance. If a bill is not paid within an allowed time, the charging system may block access of the respective wireless terminal to the RAN. With a pre-paid plan for a wireless terminal, the charging system may deduct from a pre-paid balance for a wireless terminal, and the charging system may block access of the wireless terminal to the RAN if the pre-paid balance is not maintained at a sufficient level.

In current charging systems, sharing of a balance between two or more wireless terminals may need to be limited to configurations that are initially set up as a part of the basic subscriptions. Moreover, shared balances may be limited to two levels, and future expansion of current balancing sharing configurations beyond two levels may be limited. Existing shared balance configurations, for example, may be provided primarily to handle shared funding situations for involved subscribers, but may not be configured to support aggregation of consumption. Hierarchies in billing and charging may be configured as relations between subscribers or customers thereby potentially limiting possibilities to use hierarchies for functions such as aggregation of usage or charging a lower level subscriber or customer.

Existing charging systems and methods may thus fail to provide sufficient flexibility to address changing customer demands.

SUMMARY

It may therefore be an object to address at least some of the above mentioned disadvantages and/or to improve performance in a charging system.

According to some embodiments of the present invention, charging control may be provided for a charging controlled service accessed by a terminal in a communication network using a first account having a first account balance associated with the terminal. A first request may be received for a charging reservation relating to the first account balance associated with the terminal. Responsive to the first request for a charging reservation and responsive to a first status of the first account balance, a first consumer deduction amount may be reserved from the first account balance to allow the charging controlled service for the terminal. While allowing the charging controlled service for the terminal based on the first consumer deduction amount reserved from the first account balance, a replenishment request may be generated directed to a second account balance responsive to a second status of the first account balance. Responsive to the replenishment request, a replenishment amount may be deducted from the second account balance wherein the replenishment amount represents a quantity of communication services. The first account balance may be updated based on the replenishment amount deducted from the second account balance. After updating the first account balance, a second request may be received for a charging reservation relating to the first account balance associated with the terminal. Responsive to the second request for a charging reservation and responsive to a third status of the first account balance, a second consumer deduction amount may be reserved from the first account balance to allow the charging controlled service for the terminal.

Responsive to the replenishment request directed to the second account balance, verification that the first account balance is authorized for replenishment from the second account balance may be performed, and deducting the replenishment amount may include deducting the replenishment amount responsive to verifying that the first account balance is authorized. Responsive to reserving the first consumer deduction amount, verification that the second account balance is available to replenish the first account balance may be performed, and generating the replenishment request may include generating the replenishment request responsive to verifying that the second account balance is available for replenishment.

Responsive to the first request for a charging reservation and responsive to a first status of the first account balance, the first consumer deduction amount may be deducted from the first account balance. Responsive to deducting the first consumer deduction, a determination that the first account balance is less than a replenishment threshold may be made. Generating the replenishment request may include generating the replenishment request responsive to determining that the first account balance is less than the replenishment threshold.

The quantity of communication services may represent a first quantity of communication service, each of the first and second consumer deduction amounts may represents a second quantity of communications services, and the first quantity of communications services may be greater than the second quantity of communications services. Before generating the replenishment request directed to a second account balance, communication service may be consumed by using the charging controlled service between the network and the terminal. Responsive to termination of using the charging controlled service, the first account balance may be updated based on the first and second consumer deduction amounts.

Responsive to the replenishment request directed to the second account balance, the first quantity of communication services for the replenishment amount to be deducted may be determined based on the first account for which the replenishment request was generated. Responsive to determining the first quantity of communication services, a determination that the second account balance is sufficient to cover the first quantity of communication services may be made, and deducting the replenishment amount may include deducting the replenishment amount responsive to determining that the second balance is sufficient.

The terminal may be a first terminal, and communication between the network and a second terminal may be allowed based on the second account balance. The first and second quantities of communication services may represent first and second quantities of time and/or data allowed for communication.

Responsive to a status of the second account balance, a second replenishment request may be generated directed to a third account balance. Responsive to the second replenishment request, a second replenishment amount may be deducted from the third account balance wherein the second replenishment amount represents a second quantity of communication services. The second account balance may be updated based on the second replenishment amount deducted from the third account balance.

According to some other embodiments, a charging system in a communications network may include an account database and a charging processor coupled to the account database. The account database may include a first account defining a first account balance associated with a terminal configured for communication using a charge controlled service provided by the network and a second account defining a second account balance. The charging processor may be configured to receive a first request for a charging reservation relating to the first account balance associated with the terminal, to reserve a first consumer deduction amount from the first account balance to allow the charging controlled service for the terminal responsive to the first request for a charging reservation and responsive to a first status of the first account balance, to generate a replenishment request directed to a second account balance responsive to a second status of the first account balance while allowing the charging controlled service for the terminal based on the first consumer deduction amount reserved from the first account balance, to deduct a replenishment amount from the second account balance responsive to the replenishment request wherein the replenishment amount represents a quantity of communication services, to update the first account balance based on the replenishment amount deducted from the second account balance, to receive a second request for a charging reservation relating to the first account balance associated with the terminal after updating the first account balance, and to reserve a second consumer deduction amount from the first account balance to allow the charging controlled service for the terminal responsive to the second request for a charging reservation and responsive to a third status of the first account balance.

BRIEF DESCRIPTION OF THE DRAWINGS

The accompanying drawings, which are included to provide a further understanding of the disclosure and are incorporated in and constitute a part of this application, illustrate certain non-limiting embodiment(s) of the invention. In the drawings:

FIGS. 3A, 3B, and 3C are a block diagrams illustrating different accounts according to some embodiments of the account database of FIG. 2;

DETAILED DESCRIPTION

Figure 1:
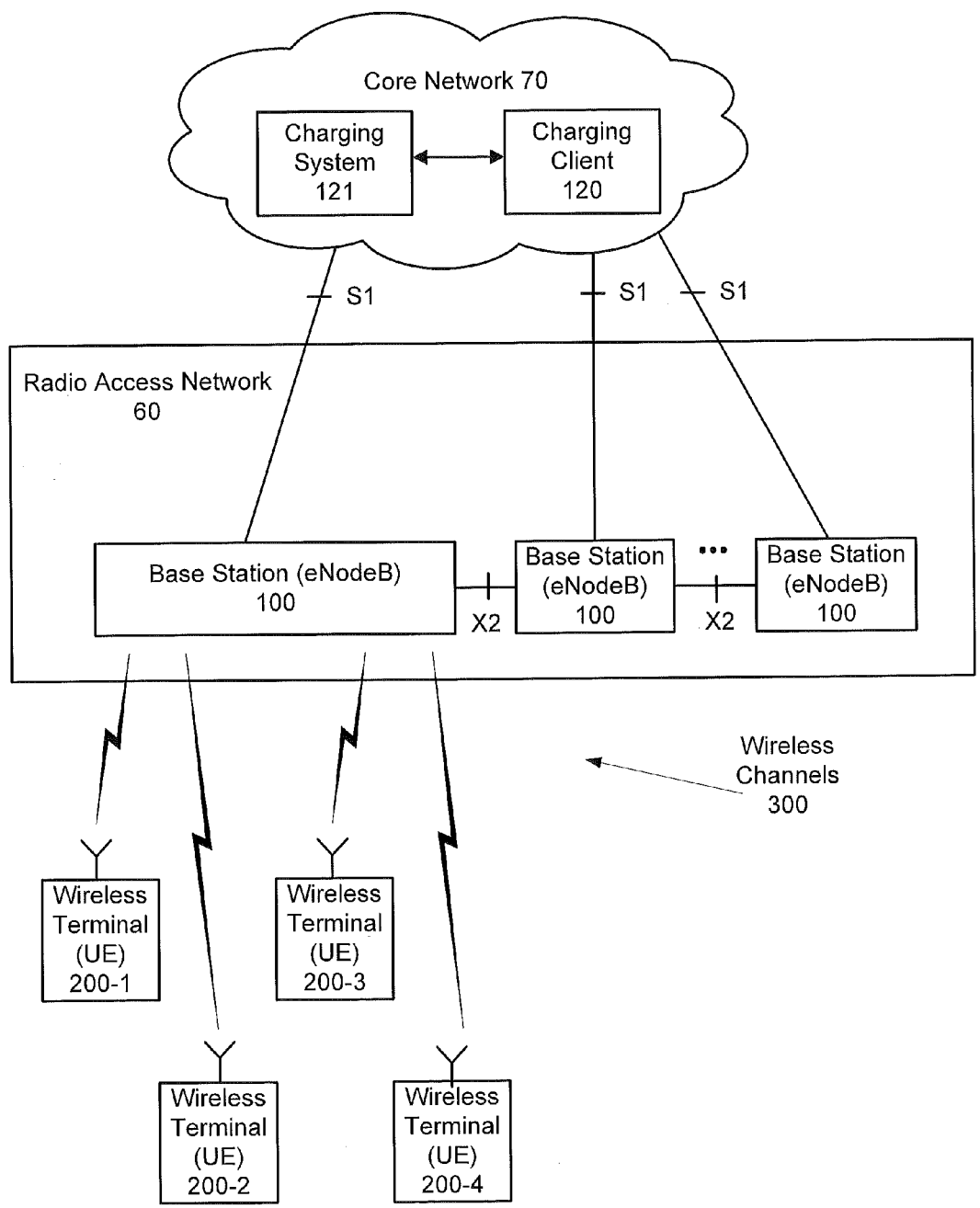
FIG. 1 is a block diagram of a communication system that is configured according to some embodiments.

The invention will now be described more fully hereinafter with reference to the accompanying drawings, in which examples of embodiments of the invention are shown. This invention may, however, be embodied in many different forms and should not be construed as limited to the embodiments set forth herein. It should also be noted that these embodiments are not mutually exclusive. Components from one embodiment may be tacitly assumed to be present/used in another embodiment.

For purposes of illustration and explanation only, these and other embodiments of the present invention are described herein in the context of operating in a Radio Access Network (RAN) that communicates over radio communication channels with wireless terminals (also referred to as UEs). It will be understood, however, that the present invention is not limited to such embodiments and may be embodied generally in any type of communication network. As used herein, a wireless terminal or UE can include any device that receives data from a communication network, and may include, but is not limited to, a mobile telephone ("cellular" telephone), laptop/portable computer, pocket computer, hand-held computer, and/or desktop computer.

In some embodiments of a RAN, several base stations can be connected (e.g., by landlines or radio channels) to a radio network controller (RNC). The radio network controller, also sometimes termed a base station controller (BSC), supervises and coordinates various activities of the plural base stations connected thereto. The radio network controllers are typically connected to one or more core networks. In other embodiments, elements/functionality of a radio network controller may be included in the base stations.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) technology. UTRAN, short for UMTS Terrestrial Radio Access Network, is a collective term for the Node B's and Radio Network Controllers which make up the UMTS radio access network. Thus, UTRAN is essentially a radio access network using wideband code division multiple access for UEs.

The Third Generation Partnership Project (3GPP) has undertaken to further evolve the UTRAN and GSM based radio access network technologies. In this regard, specifications for the Evolved Universal Terrestrial Radio Access Network (E-UTRAN) are ongoing within 3GPP. The Evolved Universal Terrestrial Radio Access Network (E-UTRAN) comprises the Long Term Evolution (LTE) and System Architecture Evolution (SAE).

Note that although terminology from 3GPP ($3^{rd}$ Generation Partnership Project) LTE (Long Term Evolution) may be used in this disclosure to exemplify embodiments of the invention, this should not be seen as limiting the scope of the invention to only these systems. Other wireless systems, including WCDMA (Wideband Code Division Multiple Access), WiMax (Worldwide Interoperability for Microwave Access), UMB (Ultra Mobile Broadband) and GSM (Global System for Mobile Communications), may also benefit from exploiting embodiments of the present invention disclosed herein.

Also note that terminology such as base station (also referred to as eNodeB or Evolved Node B) and wireless terminal (also referred to as UE or User Equipment) should be considering non-limiting and does not imply a certain hierarchical relation between the two. In general a base station (e.g., an "eNodeB") and a wireless terminal (e.g., a "UE") may be considered as examples of respective different communications devices that communicate with each other over a wireless radio channel.

FIG. 1 is a block diagram of a communication system that is configured to operate according to some embodiments of the present invention. An example RAN 60 is shown that may be a Long Term Evolution (LTE) RAN. The LTE RAN is a variant of a 3GPP RAN where radio base stations (e.g., eNodeBs) 100 are connected directly to one or more core networks 70 rather than to radio network controller (RNC) nodes. In LTE, functionality of a radio network controller (RNC) node may be performed by the radio base stations 100. Radio base stations 100 communicate over wireless channels 300 with wireless terminals (also referred to as user equipment nodes or UEs) 200-1 to 200-$n$ that are within their respective communication service cells (also referred to as coverage areas). The radio base stations 100 can communicate with one another through an X2 interface and with the core network(s) 70 through S1 interfaces, as will be known to those having skill in the art.

In addition, charging client 120 and charging system 121 may be used to control access of wireless terminals 200 to radio access network based on respective accounts (e.g., as defined by subscriptions and/or pre-paid plans) for the wireless terminals 200. While charging client 120 and charging system 121 are shown in core network 70 by way of example, charging client 120 and/or charging system 121 may be implemented as an element of Radio Access Network 60, and/or elements/functionality of charging client 120 and/or charging system 121 may be distributed between Radio Access Network 60 and Core Network 70.

Charging client 120, for example, may be a node such as a switch, a mobile switching center (MSC), a service node, an application server, a General Packet Radio Service (GPRS) Gateway support node, or any other node providing service to wireless terminals. Moreover, charging client 120 may allow or block such service for a wireless terminal responsive to an account balance for the wireless terminal as determined by charging system 121.

Figure 2:
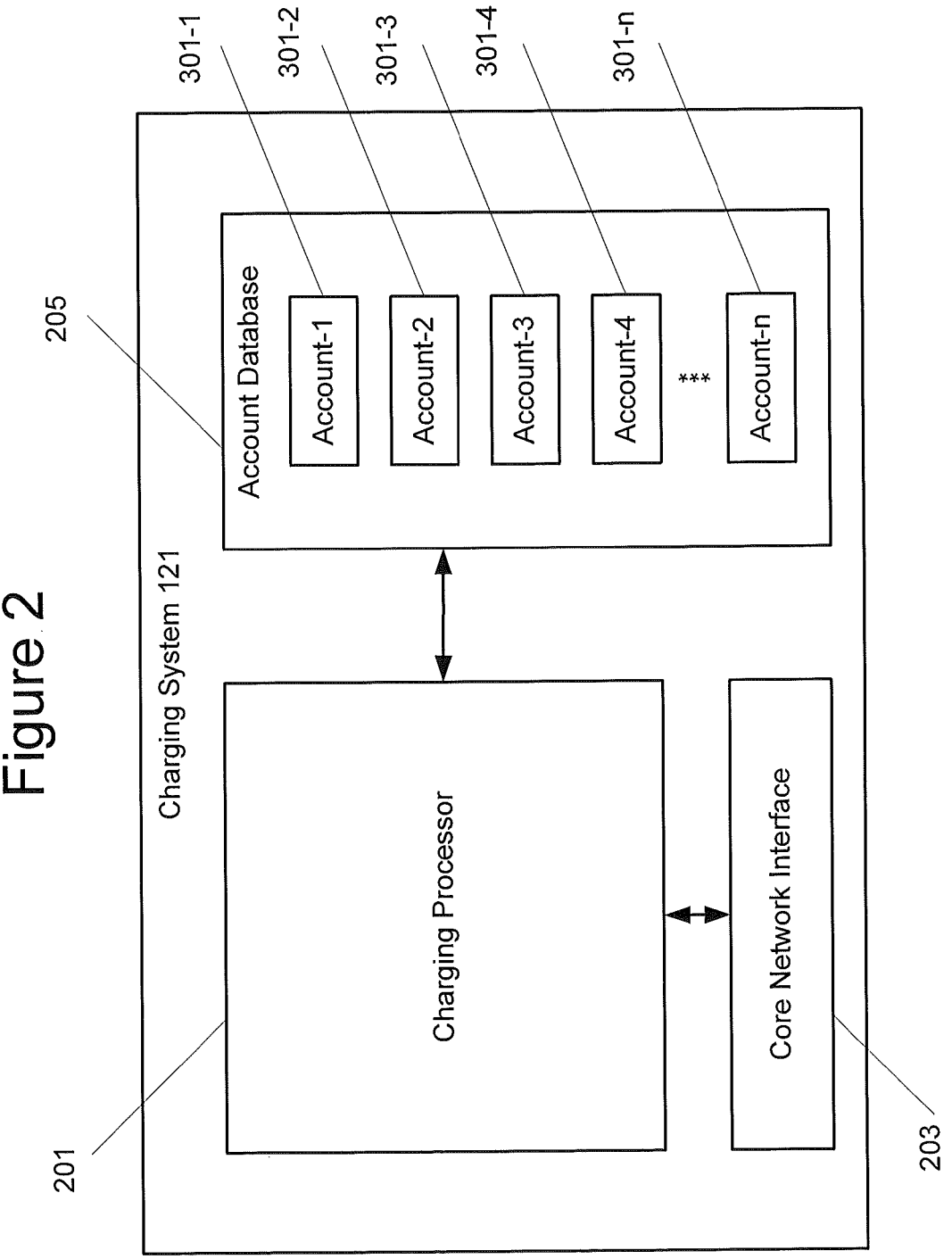
FIG. 2 is a block diagram of a charging system according to some embodiments of FIG. 1.

FIG. 2 is a block diagram of charging system 121 according to some embodiments of FIG. 1. As shown in FIG. 2, charging system 121 may include a charging processor 201 coupled to an account database 205 and a network interface 203. Account database 205 may store information for a plurality of accounts corresponding to respective ones of wireless terminals 200, and network interface 203 may provide an interface to allow communication between charging processor 201 and charging client 120.

FIGS. 3A, 3B, and 3C are a block diagrams illustrating related respective accounts Account-1 301-1, Account-2 301-2, and Account-$n$ 301-$n$ of account database 205 of FIG. 2 according to some embodiments. Each account may maintain a respective account balance (e.g., Account-1 Balance 303$a$, Account-2 Balance 303$b$, Account-$n$ Balance 303-$n$, etc.), and information regarding supported account products (e.g., Account-Products 305$a$, Account Products 305$b$, Account Products 305-$n$, etc.).

Account-1 301-1 and Account-2 301-2 may be provided for first and second wireless terminals 200-1 and 200-2, and each of these accounts may include a respective reservation balance 305$a$ and 305$b$ used to reserve portions of the respective account balance during wireless communications between the respective wireless terminal and RAN 60. In addition, the respective Account Products may identify products/services available for the respective wireless terminals. Account Products 305$a$ may thus provide information for a voice product 311$a$ (e.g., radiotelephone service), a data product 315$a$ (e.g., Internet service), and a texting product 317$a$ (e.g., text messaging service) that RAN 60 is to support for the wireless terminal 200-1 corresponding to Account-1 301-1. Similarly, Account Products 305$b$ may provide information for a voice product 311$b$ (e.g., radiotelephone service), a data product 315$b$ (e.g., Internet service), and a texting product 317$b$ (e.g., text messaging service) that RAN 60 is to support for the wireless terminal corresponding to Account-2 301-2. Because Account-n is not directly associated with a particular wireless terminal, Account Products 305$n$ may not include any service products such as voice, data, and/or texting products. Instead, Account-n may merely provide replenishment for one or more lower level account balances that may be directly associated with one or more particular wireless terminals.

In addition, Account Products 305$a$ may provide information for a Consumer Product 309$a$ that identifies another account balance (e.g., Account-2 Balance 303$b$) from which Account-1 Balance 303$a$ may be replenished, and Account Products 305$b$ may provide information for a Provider Product 307$b$ that identifies another account balance (e.g., Account-1 Balance 303$a$) that may be replenished from Account-2 Balance 303$b$. As discussed in greater detail below, a Consumer/Producer Product pair may allow an account balance of one wireless terminal (provisioned with a consumer product) to be replenished from an account balance of another wireless terminal (provisioned with a provider product). While Account-2 is illustrated with only one Provider Product 309$b$ (which may be linked to Consumer Product 309$a$), Account Products 305$b$ may include a plurality of provider products providing replenishment links to a respective plurality of other accounts provisioned with corresponding consumer products.

On the other hand, Account-n 301-$n$ may be provided as an aggregation account that is not associated with an individual wireless terminal, and instead, Account-n Balance 303$n$ may be used only to replenish other account balances. Accordingly, Account Products 305$n$ may include only Provider Product 307$n$ that may be linked to Consumer Product 309$b$ of Account-2 301-2. This consumer/provider product pair may allow Account-2 301-2 to replenish its Account-2 Balance 303$b$ from Account-n Balance 303$n$. While Account-n 301-$n$ is illustrated with only one Provider Product 307$n$, Account Products 305$n$ may include a plurality of provider products providing replenishment links to a respective plurality of other accounts provisioned with corresponding consumer products. Moreover, Account Products 305$n$ may also include a consumer product linked to a provider product of yet another account allowing Account-n 301-$n$ to replenish Account-n Balance 303$n$ from an account balance of an account provisioned with a corresponding provider product.

In examples discussed below, Account-1 Balance 303$a$ may be replenished from Account-2 Balance 303$b$, and Account-2 Balance 303$b$ may be replenished from Account-n Balance 303-$n$ to provide a hierarchy of balance sharing. While a three-level hierarchy without branches is shown by way of example, any number of levels and/or branches may be provided by provisioning appropriate consumer/provider product pairs. Account-1 301-1, for example, may be provisioned with a plurality of Provider Products to allow replenishment from Account-1 Balance 303$a$ to respective accounts provisioned with respective Consumer Products, and/or Account-n 301-*n* may be provisioned with a Consumer Product so that Account-n Balance 303-*n* may be replenished from another account provisioned with a corresponding consumer product.

According to embodiments of the present invention, account balance sharing and account balance hierarchy may be relatively easy to configure as standalone products (i.e., as corresponding Consumer Product and Provider Product pairs). These consumer/provider product pairs may be assigned/provisioned to subscriber/aggregator accounts during runtime without changing a subscriber's basic subscription. As discussed above, a Consumer Product 309 allows a subscriber account to link upwards in a hierarchy (to replenish its balance from the balance of a higher account in the hierarchy), and a Provider Product 307 allows a subscriber account to link downwards in a hierarchy (to replenish the balance of another lower account in the hierarchy).

A Consumer Product 309 may have a loosely configured connection/coupling to/with one or more Provider Products 307 depending on rules of the Consumer Product. This connection from a consumer account (provisioned with a consumer product) to a provider account (provisioned with a provider product) may be controlled by charging processor 201 using a rule engine with all possibilities of rating plus the use of attributes, which can be used for dynamic provider/collector product addressing.

A Consumer Product 309 may thus make balances available to its account, by replenishing its account balance from the account balance of another account having a corresponding Provider Product 307. In a Consumer Product to Provider Product Connection, the Consumer Product may obtain balance replenishment (e.g., additional funding) according to configurable thresholds.

If an account is provisioned with a plurality of Provider Products to allow replenishment to a plurality of accounts (also referred to as an aggregator account), charging processor 201 may aggregate consumption from the aggregator account according to rules for the aggregator account. At each balance transaction, charging processor 201 may use rule based logic to evaluate the need for replenishment from the Provider Product 307.

As shown in FIG. 3B, an account may be provisioned with both provider and consumer products, allowing the account to replenish one or more other accounts lower in the hierarchy and also to be replenished from another account higher in the hierarchy. By provisioning consumer and provider products as account products, replenishment hierarchies may be modified at any time by adding/deleting consumer/provider product pairs.

Moreover, hierarchical balance updates may be performed asynchronously responsive to real time charging events, and may thus be performed with real time performance and perceived as part of the initiating real time event. Stated in other words, charging processor 201 may replenish an account balance for a wireless terminal in real time while the wireless terminal is communicating through RAN 60 and charging client 121.

In pre-paid rating/charging in real-time, an amount is reserved at session startup and after a specified deduction time, this amount is charged and the reservation is renewed as long as the charged session lasts.

At the consumption side, hierarchical balances (the Consumer balances in a Consumer to Provider connection) can be assigned to a subscriber. The hierarchical balances can be of all types needed for the subscriber's consumption. Balance levels may be controlled by Consumer Product (replenishment) rules as well as by rules of the corresponding Provider Product. In on-line charging, a hierarchal balance may be used in real time, and the value available may be configured at a minimum to be more than the reservation value to provide undisturbed real time charging. At the same time, the hierarchical replenishment Consumer Product may be triggered and defined rules may decide if replenishment is needed. If replenishment is needed, a replenishment request may be transmitted to the account with the associated Provider Product. Depending on a distribution of elements of the charging system, the replenishment request may be transmitted internally within a consolidated charging system or externally to another element of a distributed charging system.

The replenishment request may be recognized by the Account including the associated Provider Product as a hierarchical replenishment request, and the replenishment request may be sent to the Provider Product. The Provider Product may then be used to certify the replenishment request according to rules of the Provider Product, for example, using a PIN (personal identification number) code, a certificate, a look-up number list service, etc. The resulting replenishment may be sent as a part of a response to the replenishment request or as a separate replenishment according to rules of the Provider Product.

A subscriber acting as a provider using a Provider Product as an Account Product of its Account may use hierarchical balances connected to Consumer Products to build replenishment hierarchies in many levels. At each level of such a hierarchy, it may be possible to provide individual rule based consumption control.

An aggregating hierarchy may follow a same workflow with Consumer Products triggering an aggregation request to a Provider Product of a collector account having a plurality of Provider Products based on rules that, for example, may aggregate for every balance change, at time intervals or after fulfilled sessions. Provider Products for a collecting account may aggregate consumption in its own Account Balance (according to the Provider Product or Products) and/or may forward aggregation requests to yet higher hierarchical levels.

Embodiments of the present invention may provide flexible account hierarchies for different purposes. According to some embodiments, a rule based sharing of account balances may be assigned to both consumer and provider accounts as add-on products (e.g., using Consumer Products and Provider Products), and/or rules of such products may be conditional, i.e., valid only under specific circumstances without changing the basic "Rate Plan." Embodiments of the present invention may thus provide possibilities for advanced spending control, and/or possibilities for conditional hierarchies (e.g., valid only at specified times of day or at specified days/dates, valid only in a geographic area, valid only for selected usage, etc.). Moreover, Consumer and/or Provider Products may be configured (e.g., established or removed) for an Account relatively easily, even with user self service and/or with expiration dates.

Charging systems discussed herein may thus provide product centric implementations to configure rating and charging with a flexible definition of balances. The balances may be created when a product offer is assigned to an Account for a subscriber (at contracting). When two or more subscribers share balances, the shared balances may be linked easily, and spending rules may be easily applied.

Figure 4:
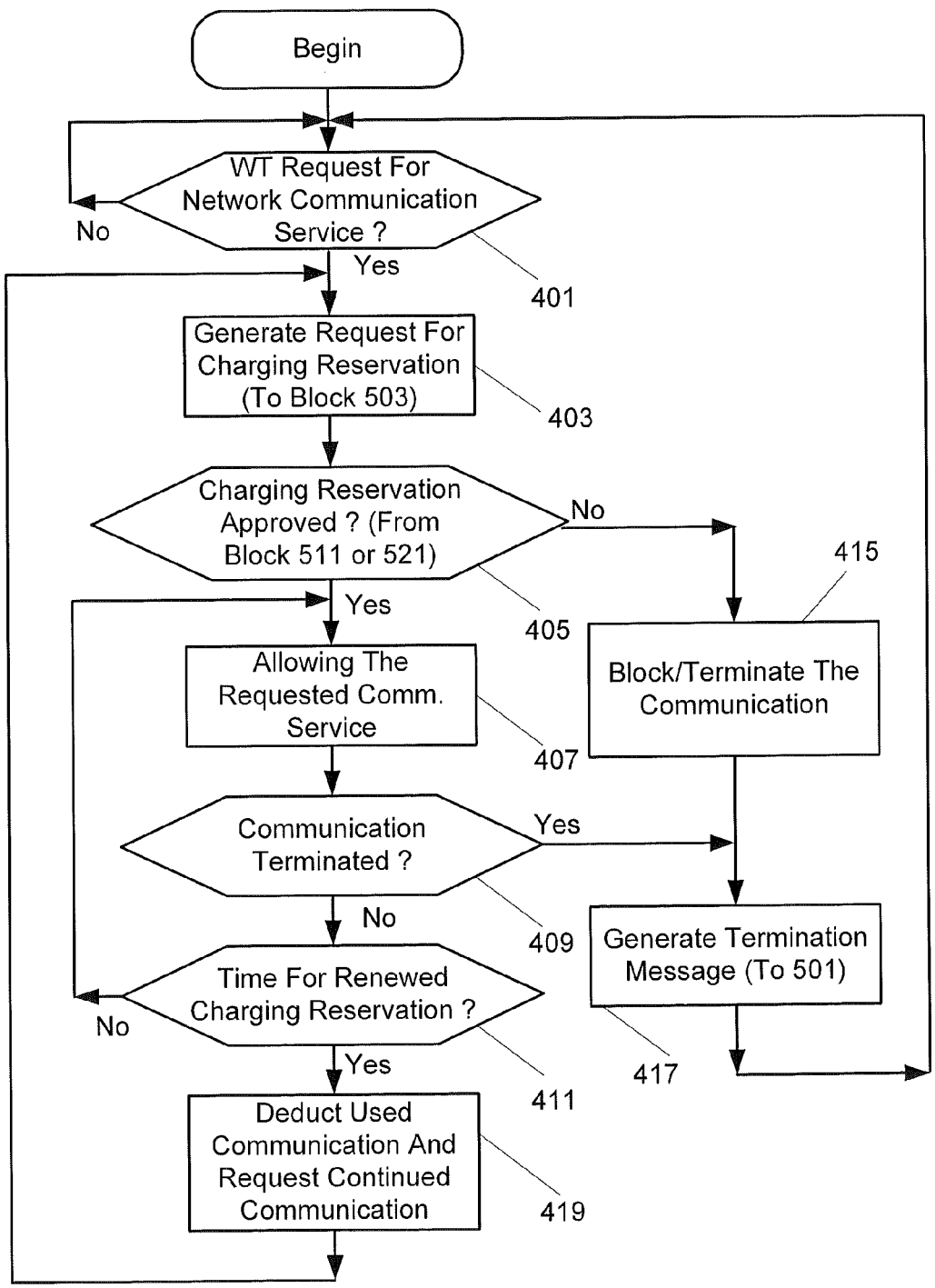
FIGS. 4, 5, 6, and 7 are flow charts illustrating operations of radio networks and charging systems according to some embodiments of FIGS. 1, 2, and 3.
Figure 5:
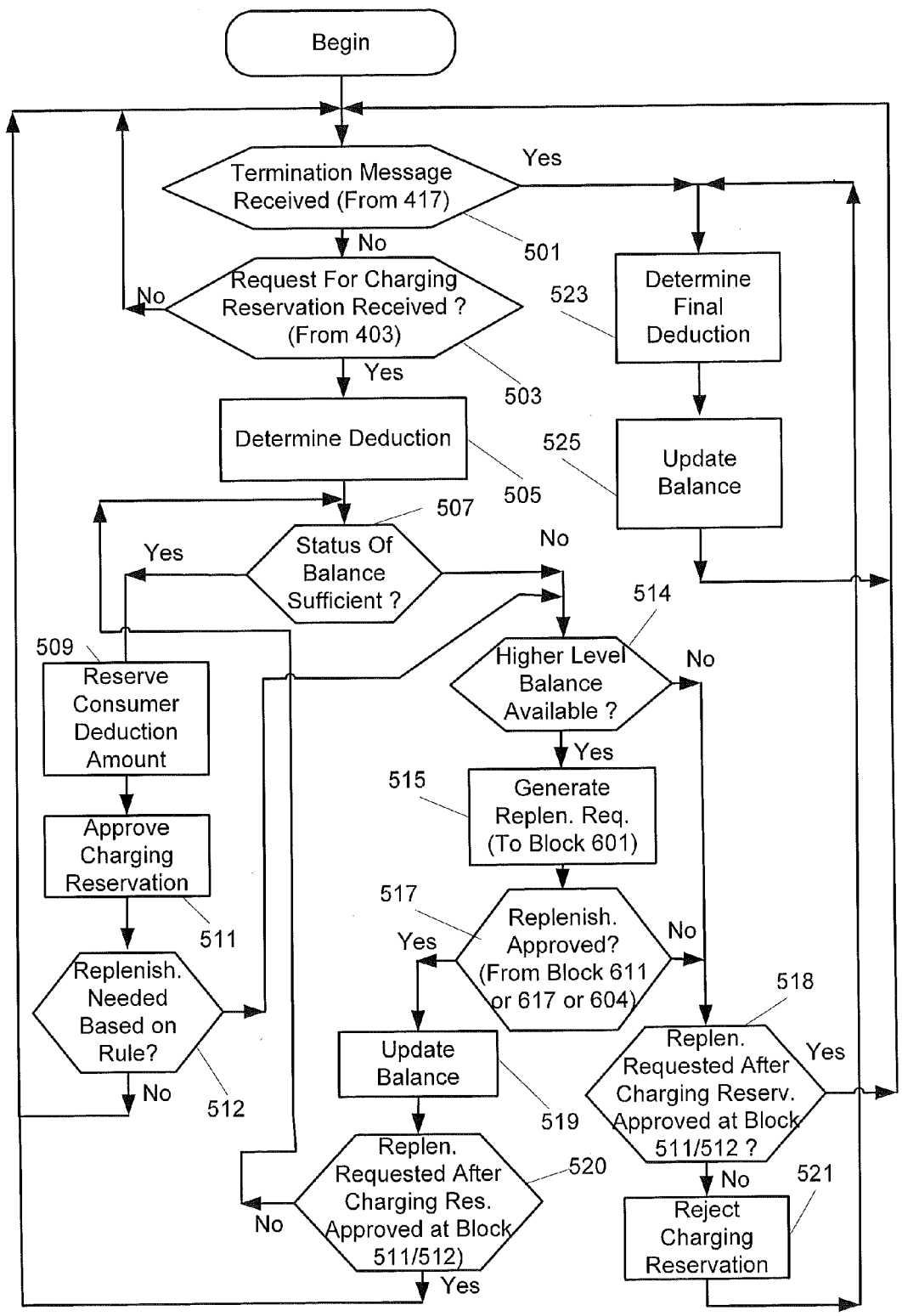
Figure 6:
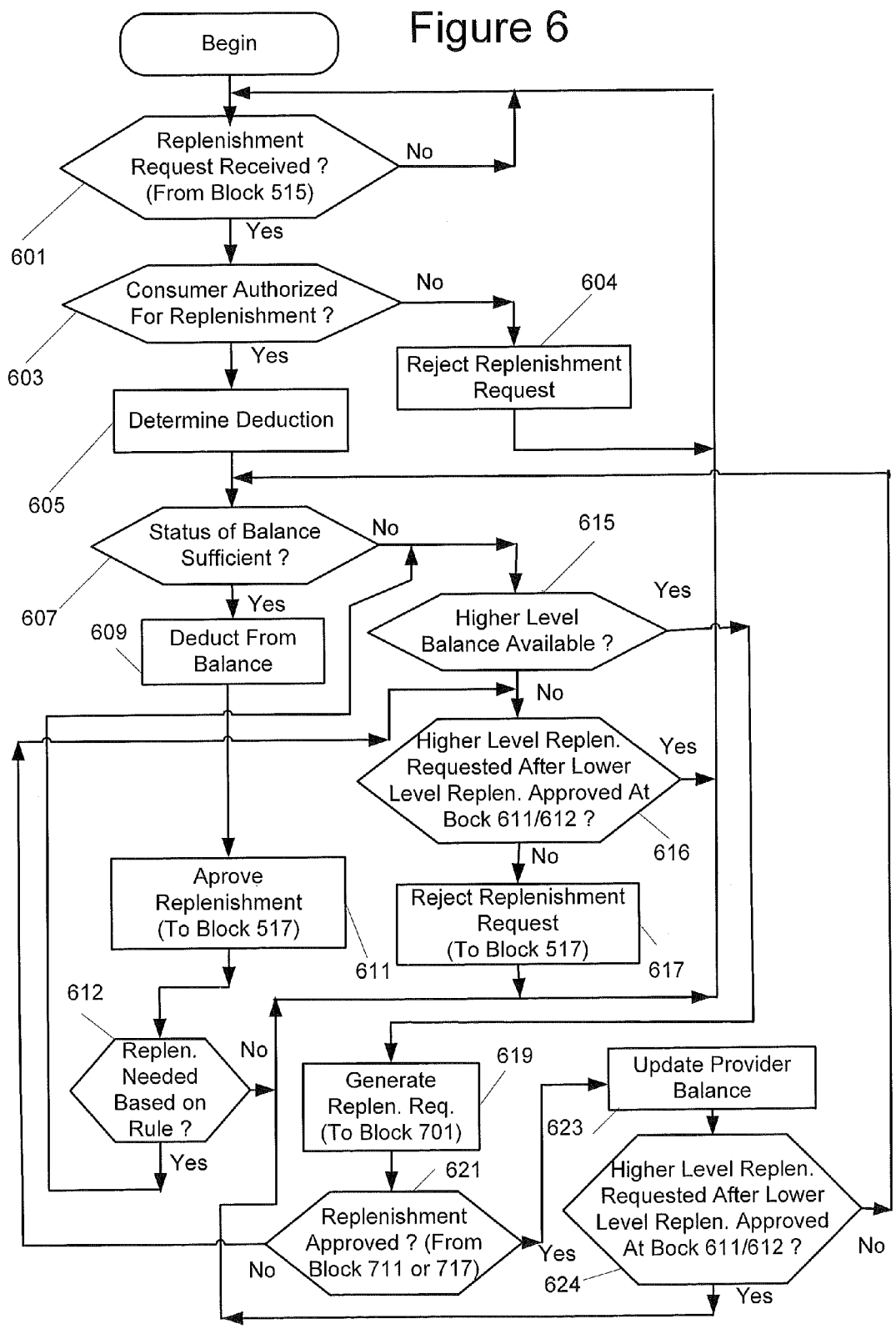

Operations of charging system 121 and related elements will be discussed in greater detail below with respect to the flow charts of FIGS. 4, 5, 6, and 7. FIG. 4 illustrates operations of charging client 120 to establish/maintain a communication, FIG. 5 illustrates operations of charging system 121 relating to Account-1 of FIG. 3A, FIG. 6 illustrates operations of charging system 121 relating to Account-2 of FIG. 3B, and FIG. 3C illustrates operations of charging system 121 relating to Account-n of FIG. 3C. As discussed in greater detail below, Consumer Product 309a of Account-1 may be linked to Provider Product 307b of Account-2 so that Account-1 Balance 303a may be replenished from Account-2 Balance 303b, and Consumer Product 309b of Account-2 may be linked to Provider Product 307n of Account-n so that Account-2 Balance 303b may be replenished from Account-n Balance 303n.

Account-1 of FIG. 3A, for example, may support a subscription for wireless terminal 200-1, and charging processor 201 may allow or block communications from wireless terminal 200-1 based on a status of Account-1 Balance 303a. As wireless terminal 200-1 consumes communications services, Account-1 Balance 303a may be diminished, and charging processor 201 may replenish Account-1 Balance 303a from Account-2 Balance 303b based on linked Consumer and Provider Products 309a and 307b.

Similarly, Account-2 of FIG. 3B may support a subscription for wireless terminal 200-2, and charging processor 201 may allow or block communications from wireless terminal 200-2 based on a status of Account-1 Balance 303a. As wireless terminal 200-2 consumes communications services and/or as Account-1 is replenished from Account-2 Balance, Account-2 Balance 303b may be diminished, and charging processor 201 may replenish Account-2 Balance 303b from Account-n Balance 303n based on linked Consumer and Provider Products 309b and 307n.

As shown in FIG. 4, wireless terminal 200-1 may request network communication service through base station 100, and the request may be received (through RAN 60 and core network 70) at charging client 121 at block 401. When such a request is received, charging client 120 may generate a request for a charging reservation at block 403 against Account-1 Balance 303a at block 403, with the request for charging reservation being transmitted to charging system 121. As discussed in greater detail below with respect to block 503 of FIG. 5, processor 201 of charging system 121 may proceed to approve/reject the charging reservation and/or to deduct/replenish Account-1 Balance 303a.

If the charging reservation is rejected by charging processor 201 as discussed in greater detail below with respect to block 521 of FIG. 5, charging client 120 may receive the rejection at block 405 and block the requested communication service at block 415. Responsive to blocking the initial request for communication services, charging client 120 may generate a termination message at block 417 that is transmitted to charging system 121 and return to decision block 401, or charging client 120 may simply return to decision block 401. At decision block 401, charging client 120 may await a next request for communication services.

If the charging reservation is approved by charging processor 201 as discussed in greater detail below with respect to block 511 of FIG. 5B, charging client 120 may receive the approval at block 405 and allow the requested communication service at block 407. As long as the communication service is not terminated by wireless terminal 200-1 or by another party in communication with wireless terminal 200-1 at block 409, and as long as the time for a renewed charging reservation has not arrived at block 411, charging client 120 may continue allowing the requested communication service at block 407.

If the communication is terminated at block 409, charging client 120 may generate a termination message at block 501 that is received by charging processor 201 at block 501 as discussed in greater detail below. Charging client 120 may then return to decision block 401 to await a next request for communication services.

When the time for a renewed charging reservation arrives at block 411, charging client 120 may deduct used communication and request continued communication at block 419, and then return to block 403 to generate another request for a charging reservation. Charging client may then repeat operations of blocks 403, 405, 407, 409, 411, and 419 until a requested charging reservation is rejected at block 405 or the communication is terminated at block 409.

When establishing and/or maintaining a communication with wireless terminal 200-1, charging client 120 may thus generate requests for charging reservations with respect to Balance 303a of Account-1 associated with wireless terminal 200-1. Accordingly, the requests for charging reservations relating to wireless terminal 200-1 may include a code/identification linking the request with Account-1 that is associated with wireless terminal 200-1.

FIG. 5 illustrates operations of charging processor 201 with respect to Account-1 to support operations of wireless terminal 200-1 associated therewith. With respect to wireless terminal 200-1 and Account-1, charging processor 201 may loop through decision blocks 501 and 503 until a request for a charging reservation is received from charging client 120 (see block 403). While block 501 is included in this initial loop before receiving an initial request for charging reservation, block 501 may not be a real consideration until after an initial charging reservation has been approved and charging client 120 has begun providing communication service for wireless terminal 200-1.

Upon receipt of an initial request for charging reservation at block 503 identifying Account-1 associated with wireless terminal 200-1, charging processor 201 may determine a deduction amount at block 505 and determine if a status/level of Account-1 Balance 303a is sufficient to approve the reservation request. The deduction amount may be determined based on an identification of the wireless terminal 200-1 and/or Account-1 associated therewith, based on the communication product being used (e.g., voice product 311a, data product 315a, texting product 317a, etc.). The particular communication product 311a, 315a, or 317a, for example, may define a deduction amount allowed for a charging reservation and/or a status/level of Account-1 Balance 303a that is required to approve such a charging reservation.

If the status of Account-1 Balance 303a is sufficient at block 507, charging processor 201 may reserve the consumer deduction amount at block 509 from Account-1 Balance 303a and approve the charging reservation at block 511 thereby allowing charging client 120 to proceed with the requested communication at blocks 405 and 407 as discussed above. At block 512, charging processor 201 may determine (after approving the charging reservation at blocks 509 and 511) whether replenishment of Account-1 Balance 303a is needed based on a rule or rules established for Account-1 in Consumer Product 309a. According to some embodiments, a first threshold status/level (set forth in a service product for the communication service being used, such as Voice Product 311a, Data Product 315a, Texting Product 317a, etc.) may be used to determine if Account-1 Balance 303a is sufficient to approve a charging reservation at block 507, and a second threshold status/level (set forth in Consumer Product 309a) may be used to determine if replenishment of Account-1 Balance 303a is needed/desired at block 512. Moreover, the first threshold of block 507 may be less than the second threshold status/level of block 512, so that charging processor 201 may proceed with a consumer deduction at block 509 and with charging reservation approval at block 511 even though the status/level of Account-1 Balance 303*a* may be less than the second threshold status/level for a replenishment.

If replenishment is not needed/desired at block 512, charging processor 201 may return to the loop of blocks 501 and 503 until either a termination message is received at block 501 or a request for charging reservation is received at block 503. A termination message, for example, may be generated by charging client 120 as discussed above with respect to block 417 of FIG. 4 when the communication service for wireless terminal 200-1 is terminated. Another request for charging reservation 503, for example, may be generated by charging client 120 as discussed above with respect to block 403 once a sufficient portion of a prior charging reservation has been consumed by charging client 120 providing communication service for wireless terminal 200-1.

If replenishment is needed/desired at block 512, charging processor 201 may determine at block 514 if a higher level balance is available to replenish Account-1 Balance 303*a*. In particular, charging processor 201 may determine if Account Products 305*a* for wireless terminal 200-1 is provisioned with a Consumer Product that supports replenishment. If Account Products 305*a* is not provisioned with a Consumer Product at block 514 and the replenishment was requested approving a charging reservation at block 511 and determining the desire/need for replenishment at block 512, charging processor 201 may return to the loop of blocks 501 and 503.

If Account Products 305*a* of Account-1 is provisioned with a Consumer Product that supports replenishment (e.g., Consumer Product 309*a*) from a higher level account balance at block 514, charging processor 201 may generate a replenishment request at block 515 that is directed to a second account balance (e.g., Account-2 Balance 303*b*) while charging client 120 continues to allow wireless terminal 200-1 to communicate using the charge controlled service based on the previously approved charging reservation. Consumer Product 309*a*, for example, may include an identification of Account-2 and/or linked Provider Product 307*b* thereof from which replenishment is to be requested. Consumer Product 309*a* may also include a threshold status/level of Account-1 Balance 303*a* this is used to determine if replenishment is needed/desired at block 512, and/or a replenishment amount to be requested from the higher level account (e.g., from Account-2). As discussed in greater detail below with respect to FIG. 6, charging processor 201 may reject or approve replenishment from Account-2 Balance 303*b* at blocks 604, 611, and/or 617.

If the replenishment is approved by the higher level account (e.g., based on Provider Product 307*b* of Account-2 at block 611 of FIG. 6) at block 517, charging processor 201 may proceed to update Account-1 Balance 303*a* with the replenishment amount provided by Provider Product 307*b* of Account-2 at blocks 517 and 519. As discussed in greater detail below with respect to FIG. 6, charging processor 201 may also deduct the replenishment amount from Account-2 Balance 303*b* (e.g., at block 609). If Account-1 Balance 303*a* is updated at block 519 after approving a charging reservation (e.g., following blocks 507, 509, 511, 512, 514, 515, 517, and 519) at block 520, charging processor 201 may return to the loop of blocks 501 and 503 for Account-1 while charging client 120 allows communication service for wireless terminal 200-1. If Account-1 Balance 303*a* is updated at block 519 without having approved a charging reservation (e.g., following blocks 507, 514, 515, 517, and 519) at block 520, charging processor may return to block 507 to determine if a status/level of Account-1 Balance 303*a* is now sufficient to approve a requested charging reservation.

If the replenishment is rejected by the higher level account (e.g., based on Provider Product 307*b* of Account-2 at block 611 of FIG. 6) at block 517 after having approved a charging reservation at block 518 (e.g., following a path of blocks 507, 509, 511, 512, 514, 515, 517, and 518), charging processor 201 may return to the loop of blocks 501 and 503. If the replenishment is rejected by the higher level account (e.g., based on Provider Product 307*b* of Account-2 at block 611 of FIG. 6) at block 517 without having approved a charging reservation at block 518 (e.g., following a path of blocks 507, 514, 515, 517, and 518), charging processor 201 may reject the outstanding charging reservation request (generated by charging client at block 403 of FIG. 4) at block 521 and return to the loop of blocks 501 and 503.

As discussed above, if the status of Account-1 Balance 303*a* is sufficient at block 507, charging processor 201 may reserve the consumer deduction amount at block 509 from Account-1 Balance 303*a* and approve the charging reservation at block 511. If the status of Account-1 Balance 303*a* is not sufficient at block 507, however, charging processor 201 may proceed to determine if a higher level balance is available for replenishment at block 514 without reserving the consumer deduction amount and without approving the charging reservation. Operations of blocks 515, 517, 518, 519, 520, and/or 521 may be performed as discussed above to either replenish Account-1 Balance 303*a* (e.g., from Account-2 Balance 303*b* based on Consumer/Provider Products 309*a* and 307*b*) and then reserve the consumer deduction and approve the charging reservation, or to reject the charging reservation.

As discussed above, outputs of blocks 512, 518, 520, and 521 may be directed to the loop of blocks 501 and 503.

While charging client 120 allows communication of wireless terminal 200-1 according to a communication service product (e.g., voice product 311*a*, data product 315*a*, texting product 317*a*, etc.) at block 407 of FIG. 4 and while charging processor 201 loops through blocks 501 and 503 of FIG. 5, communication services may be consumed by wireless terminal 200-1 thereby depleting a last charging reservation for wireless terminal 200-1. Accordingly, charging client 120 may generate a subsequent request(s) for charging reservation (e.g., at block 403 of FIG. 4) to trigger a subsequent charging reservation approval (e.g., at block 511), a subsequent replenishment request (e.g., at blocks 515), and/or a subsequent charging reservation rejection (e.g., at block 521).

At any time a termination message is generated/received at blocks 417/501, charging processor 201 may determine a final deduction for Account-1 Balance 303*a* based on depleted and/or partially depleted charging reservations at block 523 and then update Account-1 Balance 303*a* based on the final deduction at block 525. Charging processor 201 may then return to the loop of blocks 501 and 503 and charging client 120 may return to the loop of block 401 until a next request for communication service for wireless terminal 200-1 is received at block 401.

In general, each request for a charging reservation relating to wireless terminal 200-1 may lead to a determination at block 507 as to whether a status/level of Account-1 Balance 303*a* is sufficient for the requested reservation. If the level/status of Account-1 Balance 303*a* is sufficient at block 507, the consumer deduction may be reserved at block 509 and the charging reservation may be approved at block 511. If the level/status of Account-1 Balance 303*a* is not sufficient at block 507, may seek replenishment from a higher level account at blocks 514, 515, and 517. If the replenishment from the higher level account is approved at block 517, charging processor may update Account-1 Balance 303*a* at block 519 and return to block 507 to allow reservation of the consumer deduction at block 509 and approval of the charging reservation at block 511. If the replenishment from the higher level account is not approved at block 517, charging processor 201 may reject the charging reservation at block 521, possibly blocking/terminating the communication service for wireless terminal 200-1 at blocks 405 and 415 of FIG. 4.

If the consumer deduction is reserved at block 509 and the charging reservation is approved at block 511, charging processor 201 may determine at block 512 whether replenishment from a higher level account is needed/desired based on a threshold defined by Consumer Product 309a. If replenishment is needed/desired at block 512, charging processor 201 may proceed with operations of blocks 514, 515, 517, 518, 519, 520, and/or 521.

FIG. 6 is a flow chart illustrating operations of charging processor 201 relating to Provider Product 307b and Consumer Product 309b of Account-2, where Provider Product 307b of Account-2 is linked to Consumer Product 309a of Account-1 and Consumer Product 309b of Account-2 is linked to Provider Product 307n of Account-n.

Regarding Provider Product 307b of Account-2, charging processor 201 may loop at block 601 until a replenishment request relating to Account-1 is received (e.g., a replenishment request generated at block 515 of FIG. 5). Once a replenishment request is received at block 601, charging processor 201 may determine if the Consumer Product 309a from which the request was received is authorized for replenishment from Account-2. The requesting Consumer Product 309a, for example, may include an identification of itself (i.e., an identification of Consumer Product 309a), an identification of the linked Provider Product (i.e., an identification of Provider Product 307b), and an authorization code (e.g., a PIN code, a certificate, a look-up number list service, etc.). The linked Provider Product 309a may also include this same information. The replenishment request from Consumer Product 309a of Account-1 may thus include: the identification of linked Provider Product 307b to direct the request to the appropriate account; the identification of Consumer Product 309a to facilitate authorization of replenishment and/or to facilitate actual replenishment; and/or the authorization code to allow charging processor 201 to verify that the replenishment is authorized. Charging processor 201 may thus compare the identification of the Consumer Product address and the authorization code included in the replenishment request with the identification of the linked Consumer Product and the associated authorization code included in Provider Product 307b to determine if the replenishment is authorized at block 603.

If the replenishment request is not authorized at block 603 (e.g., because the originating Consumer Product 303a of Account-1 is not linked with Provider Product 307b of Account-2), charging processor 201 may reject the replenishment request at block 604 so that the "No" path from block 517 of FIG. 5 is taken. If a Consumer Product identification in the replenishment request does not match an authorized Consumer Product identification in Provider Product 307b and/or if an authorization code in the replenishment request does not match an authorization code in Provider Product 307b, for example, the replenishment request may be rejected at block 604.

If the replenishment request is authorized at block 603 (e.g., if a Consumer Product identification in the replenishment request matches an authorized Consumer Product identification in Provider Product 307b and if an authorization code in the replenishment request matches an authorization code in the Provider Product 307b), the replenishment request may be approved at block 603, and a deduction may be determined for a replenishment amount at block 605. The deduction for the replenishment amount may be determined at block 605 based on a replenishment amount defined by Provider Product 307b.

At block 607, charging processor 201 may determine if a status/level of Account-2 Balance 303b is sufficient to allow deduction of the replenishment amount. If so, charging processor 201 may deduct the replenishment amount from Account-2 Balance 303b at block 609 and approve the replenishment request at block 611, thereby allowing Account-1 Balance 303a to be updated with the replenishment amount as discussed above with respect to block 519 of FIG. 5. Charging processor 201 may then determine if replenishment of Account-2 Balance 303b is needed/desired at block 612, for example, based on a rule or rules set forth Consumer Product 309b. Consumer Product 309b, for example, may define a threshold status/level of Account-2 Balance 303b, such that a status/level of Account-2 Balance 303b above the threshold returns the flow to block 601 to await a next replenishment request and a status/level below the threshold initiates operations to seek replenishment from a next higher level account.

If replenishment of Account-2 Balance 303b is needed/desired at block 612, charging processor 201 may determine if a higher level balance is available for replenishment at block 615. If Account Products 305b includes a consumer product (e.g., Consumer Product 309b) that is linked to a respective provider product (e.g., Provider Product 307n) of a higher level account (e.g., Account-n), such a higher level balance may be available at block 615. If Account Products 305b does not include a consumer product, no such higher level balance may be available at block 615.

If Account Products 305b does not include a consumer product and the request for higher level replenishment has been generated at block 612 after approving a lower level replenishment request as determined at block 616, charging processor 201 may return to block 601 to await a next replenishment request from a consumer product of a lower level account. If Account Products 305b does not include a consumer product and a block 615 was reached from a negative determination at block 607, charging processor 201 may reject the lower level replenishment request at block 617 (leading to the negative flow from block 517 of FIG. 5) before returning to block 601 to await a next lower level replenishment request.

If Account Products 305b includes a consumer product (e.g., Consumer Product 309b), charging processor 201 may proceed from the affirmative output of block 615 to generate a higher level replenishment request to a Provider Product 307n of higher level Account-n at block 619. As discussed in greater detail below with respect to FIG. 7, the replenishment request of block 619 may initiate operations of FIG. 7 relating to Provider Product 307n resulting in either approval or rejection of the higher level replenishment request at block 711 or 717 of FIG. 7.

If the higher level replenishment request is approved at blocks 621/711, charging processor may update Account-2 Balance 303b at block 623. If the higher level replenishment request was initiated responsive to an approved lower level replenishment request (e.g., following blocks 607, 609, 611, 612, 615, 619, 621, 623, and 624), charging processor 201 may proceed to block 601 to await a next lower level replenishment request. If the higher level replenishment request was initiated without approving a lower level replenishment request following a negative result at block 608 (e.g., following blocks 607, 615, 619, 621, 623, and 624), charging processor 201 may return to block 607 to determine if the replenished Account-2 Balance 303b is sufficient for the lower level replenishment.

According to some embodiments, a threshold status/level (set forth in Provider Product 307b) may be used to determine if Account-2 Balance 303b is sufficient to allow a deduction for a lower level replenishment request at block 607, and another threshold status/level (set forth in Consumer Product 309b) may be used to determine if replenishment of Account-2 Balance 303b is needed/desired at block 612. Moreover, the threshold of block 607 may be less than the threshold status/level of block 612, so that charging processor 201 may proceed with a deduction at block 609 and with approval of a lower level replenishment at block 611 even though the status/level of Account-2 Balance 303b may be less than the threshold status/level for a higher level replenishment.

Figure 7:
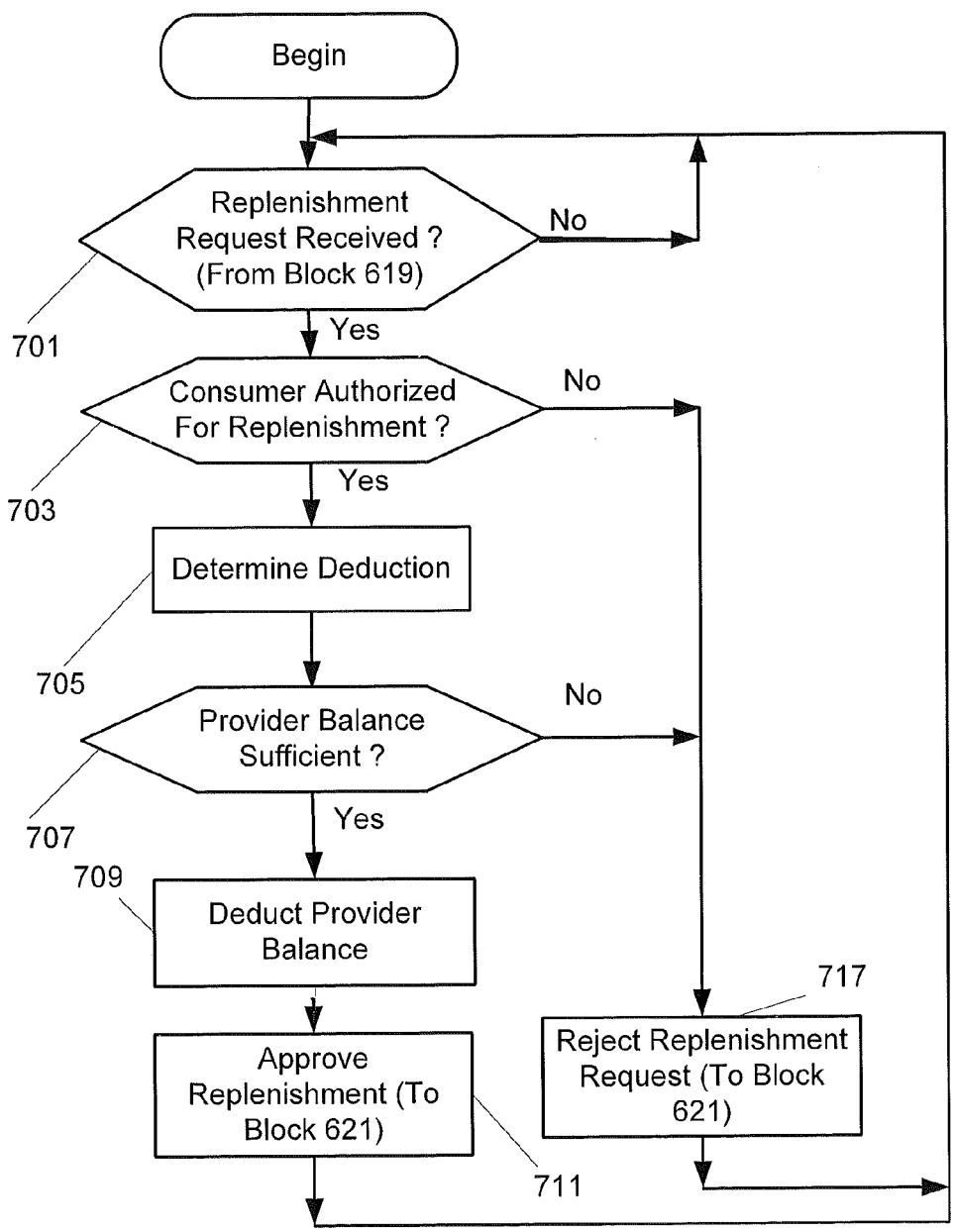

FIG. 7 is a flow chart illustrating operations of charging processor 201 relating to Provider Product 307n of Account-n, where Provider Product 307n of Account-n is linked to Consumer Product 309b of Account-2.

Regarding Provider Product 307n of Account-n, charging processor 201 may loop at block 701 until a replenishment request relating to Account-2 is received (e.g., a replenishment request generated at block 619 of FIG. 6). Once a replenishment request is received at block 701, charging processor 201 may determine if the Consumer Product 309b from which the request was received is authorized for replenishment from Account-n. The requesting Consumer Product 309b, for example, may include an identification of itself (i.e., an identification of Consumer Product 309b), an identification of the linked Provider Product (i.e., an identification of Provider Product 307n), and an authorization code (e.g., a PIN code, a certificate, a look-up number list service, etc.). The linked Provider Product 309n may also include this same information. The replenishment request from Consumer Product 309b of Account-2 may thus include: the identification of linked Provider Product 307n to direct the request to the appropriate account; the identification of Consumer Product 309b to facilitate authorization of replenishment and/or to facilitate actual replenishment; and/or the authorization code to allow charging processor 201 to verify that the replenishment is authorized. Charging processor 201 may thus compare the identification of the Consumer Product address and the authorization code included in the replenishment request with the identification of the linked Consumer Product and the associated authorization code included in Provider Product 307n to determine if the replenishment is authorized at block 703.

If the replenishment request is not authorized at block 703 (e.g., because the originating Consumer Product 303b of Account-2 is not linked with Provider Product 307n of Account-n), charging processor 201 may reject the replenishment request at block 717 so that the "No" path from block 621 of FIG. 6 is taken. If a Consumer Product identification in the replenishment request does not match an authorized Consumer Product identification in Provider Product 307n and/or if an authorization code in the replenishment request does not match an authorization code in Provider Product 307n, for example, the replenishment request may be rejected at block 717.

If the replenishment request is authorized at block 703 (e.g., if a Consumer Product identification in the replenishment request matches an authorized Consumer Product identification in Provider Product 307n and if an authorization code in the replenishment request matches an authorization code in the Provider Product 307n), the replenishment request may be approved at block 703, and a deduction may be determined for a replenishment amount at block 705. The deduction for the replenishment amount may be determined at block 705 based on a replenishment amount defined by Provider Product 307n.

At block 707, charging processor 201 may determine if a status/level of Account-n Balance 303n is sufficient to allow deduction of the replenishment amount. If so, charging processor 201 may deduct the replenishment amount from Account-n Balance 303n at block 709 and approve the replenishment request at block 711, thereby allowing Account-2 Balance 303b to be updated with the replenishment amount as discussed above with respect to block 623 of FIG. 6. While not shown in FIG. 3C, Account Products 305n may include a Consumer Product to allow replenishment from yet a higher level account.

Moreover, the deduction for a charging reservation defined by the Service product (e.g., voice product 311a, data product 315a, texting product 317a, etc.) being used by wireless terminal 200-1 may be different than the deduction for a replenishment amount defined by Provider Product 307b. More particularly, the deduction for a charging reservation may define a first quantity of communication services, the deduction for a replenishment amount may define a second quantity of communication services, and the second quantity may be greater than the first quantity. Accordingly, a single fulfilled replenishment request may provide an increase of Account-1 Balance that is sufficient to support a plurality of deductions for reservation requests. A replenishment request is thus not required after every charging reservation.

Similarly, the deduction for a lower level replenishment defined by the Provider Product 307b may be different than the deduction for a higher level replenishment amount defined by Provider Product 307n. More particularly, the deduction for a lower level replenishment may define a quantity of communication services that is different than a quantity of communication services defined by the deduction for a higher level replenishment. For example, the deduction for the lower level replenishment may be less than the deduction for the higher level replenishment. Accordingly, a single fulfilled higher level replenishment request may provide an increase of Account-2 Balance 303b that is sufficient to support a plurality of deductions for lower level replenishment requests. A higher level replenishment request is thus not required after every fulfillment of a lower level replenishment request.

As discussed herein, each deduction may reduce status/level of an account balance from which the deduction is taken, and each replenishment may increase a status/level of an account balance to which the replenishment is applied. In FIG. 5, each deduction at blocks 509/523/525 reduces a status/level of Account-1 Balance 303a, and each replenishment at blocks 517/519 increases a status/level of Account-1 Balance 303a. In FIG. 6, each deduction at block 609 (for lower level replenishment of Account-1 Balance 303a) reduces a status/level of Account-2 Balance 303b, and each higher level replenishment (from higher level Account-n Balance 303n) increases a status/level of Account-2 Balance 303b. In FIG. 7, each deduction at block 709 (for lower level replenishment of Account-2 Balance 303b) reduces a status/level of Account-n Balance 303n. As used herein a quantity of communication service may refer to a quantity of time and/or data allowed for a communication service.

In addition to providing replenishment for Account-1 Balance 303a based on Provider Product 307b, Account-2 may directly support communications services for wireless terminal 200-2 associated therewith. Account Products 305b of Account-2 may include service products (e.g., Voice Product 311b, Data Product 315b, Texting Product 317b) defining communications allowed for wireless terminal 200-2. Charging client 120 may thus perform operations of FIG. 4 to support operations of wireless terminal 200-1, and charging processor 201 may perform operations of FIG. 5 to support operations of wireless terminal 200-1. Accordingly, a same account (e.g., Account-2) may: support replenishment for one or more lower level accounts (e.g., Account-1) based on one or more respective provider products (e.g., Provider Product 305b); support communications for a wireless terminal (e.g., wireless terminal 200-2) based on one or more service products (e.g., Voice Product 309b, Data Product 311b, Texting Product 317b, etc.); and/or support replenishment from a higher level account (e.g., Account-n) based on a consumer product (e.g., Consumer Product 309b).

Figure 8:
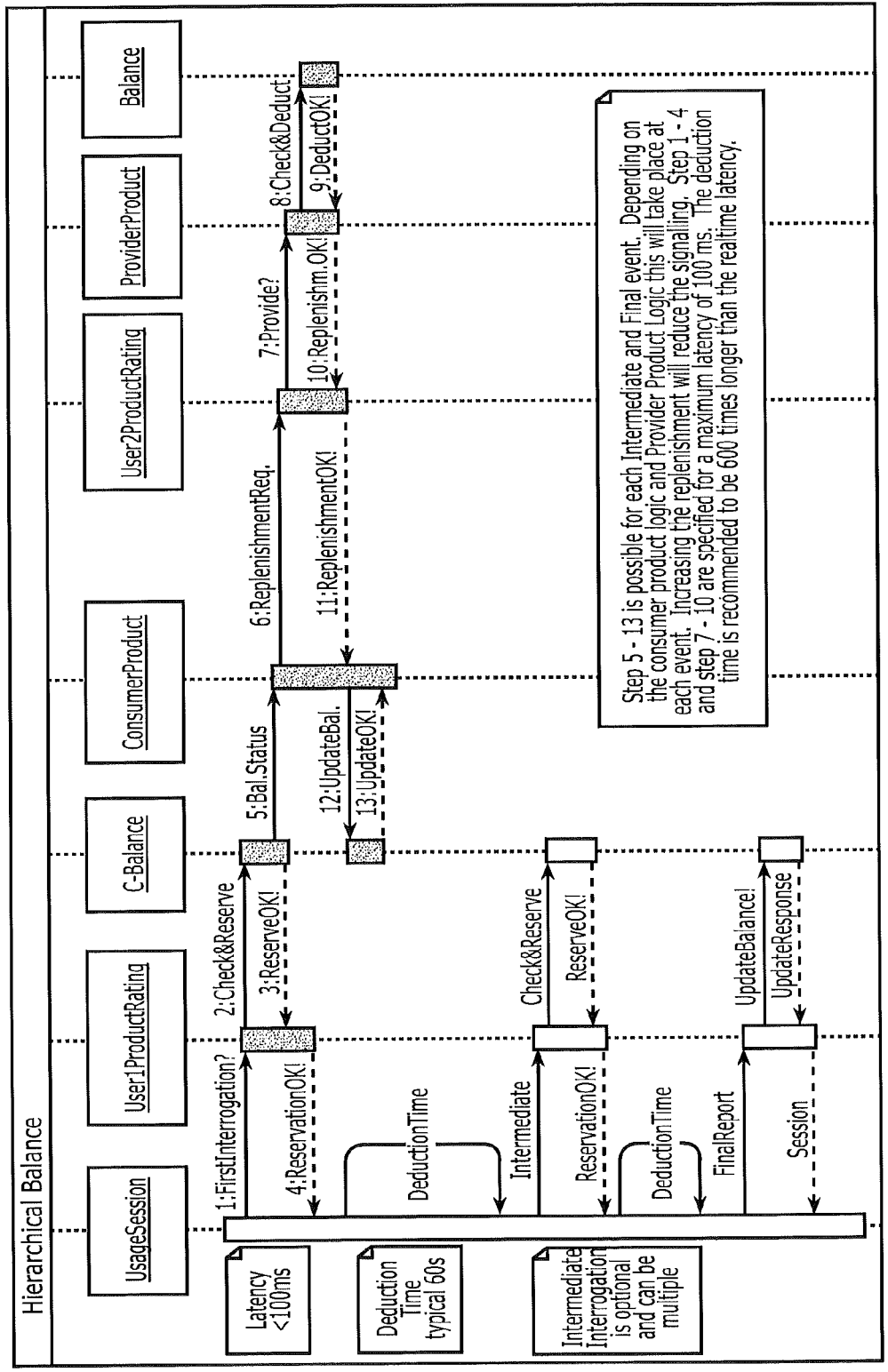
FIGS. 8 and 9 are flow diagrams illustrating operations of charging systems according to some embodiments.

FIG. 8 is a flow diagram illustrating operations supporting communications for wireless terminal 200-1 based on Account-1 with replenishment from Account-2. In FIG. 8, the Usage Session column represents operations of charging client 120 relating to wireless terminal 200-1 and Account-1, the User1ProductRating Column represents operations relating to a service product (e.g., Voice Product 311a, Data Product 315a, or Texting Product 317a) for wireless terminal 200-1, the C-Balance column represents operations relating to Account-1 Balance 303a, the ConsumerProduct column represents operations relating to Consumer Product 309a of Account-1, the User2ProductRating column represents operations relating to Account-2 (used for replenishment), the ProviderProduct column represents operations relating to Provider Product 307b, and the Balance column represents operations relating to Account-2 Balance 303b.

In FIG. 8, a FirstInterrogation (1) is a charging reservation request as discussed above with respect to blocks 403 and 503 of FIGS. 4 and 5, and Check&Reserve (2) includes determining a deduction for the charging reservation request at block 505 and determining if a status/level of Account-1 Balance 303a is sufficient for the charging reservation request at block 507 of FIG. 5. Based on sufficiency of the status/level of Account-1 Balance 303a, the charging reservation may be deducted from Account-1 Balance 303a at block 509 and the charging reservation may be approved at block 511 as indicated by ReserveOK! (3) of FIG. 8, and charging client 120 may receive the approval at block 405 and allow service at block 407 as indicated by ReservationOK! (4) of FIG. 8. Operations 1-4 of FIG. 8 may thus be performed asynchronously with respect to replenishment operations 5-13 discussed in greater detail below. A request for a charging reservation may thus be approved in less than 100 ms even if replenishment is needed.

A status/level of Account-1 Balance 303a may be checked (after deducting the charging reservation at block 509) as indicated by Bal.Status (5) corresponding to decision block 512 of FIG. 5. If replenishment from a higher level account is needed based on rules defined by Consumer Product 309a at block 512 of FIG. 5, a ReplenishmentReq. (6) may be generated as discussed above with respect to block 515, and charging processor 201 may determine whether to provide the replenishment as discussed above with respect to block 603 of FIG. 6 as indicated by Provide? (7) of FIG. 8. Charging processor 201 may then Check&Deduct (8) and DeductOK! (9) Account-2 balance 303b as discussed above with respect to blocks 605, 607, and 609 of FIG. 6. Charging Processor 201 may then proceed to approve the replenishment at blocks 611/517 as indicated by Replenishm.OK! (10) and Replen-ishmentOK! (11) of FIG. 8, and then to update Account-1 Balance 303a at block 519 as indicated by UpdateBal. (12) and UpdateOK! (13).

As shown in FIG. 8 by way of example, a charging reservation may represent 60 seconds of communication service, with a charging reservation being granted (operations 1-4) in less than 100 ms. Replenishment operations 5-13 may thus be performed asynchronously so that communication service is not interrupted. By increasing the replenishment amount, signaling may be reduced by reducing a frequency of replenishment. By providing that each charging reservation represents a sufficiently long duration of communication service, replenishment to any number of higher levels may be accommodated without interrupting service.

Intermediate charging reservations from Account-1 Balance 303a may be performed (operations 1-4 of FIG. 8) upon expiration of each prior charging reservation as long as use of the communication service continues, and while not shown in FIG. 8, subsequent replenishments (operations 5-13) may be performed as needed responsive to a charging reservation. Upon termination of a communication session at block 501 of FIG. 5, charging processor 201 may determine a final deduction and update Account-1 Balance 303a at blocks 523 and 525 as indicated by the actions FinalReport, UpdateBalance!, UpdateResponse, and Session of FIG. 8.

Figure 9:
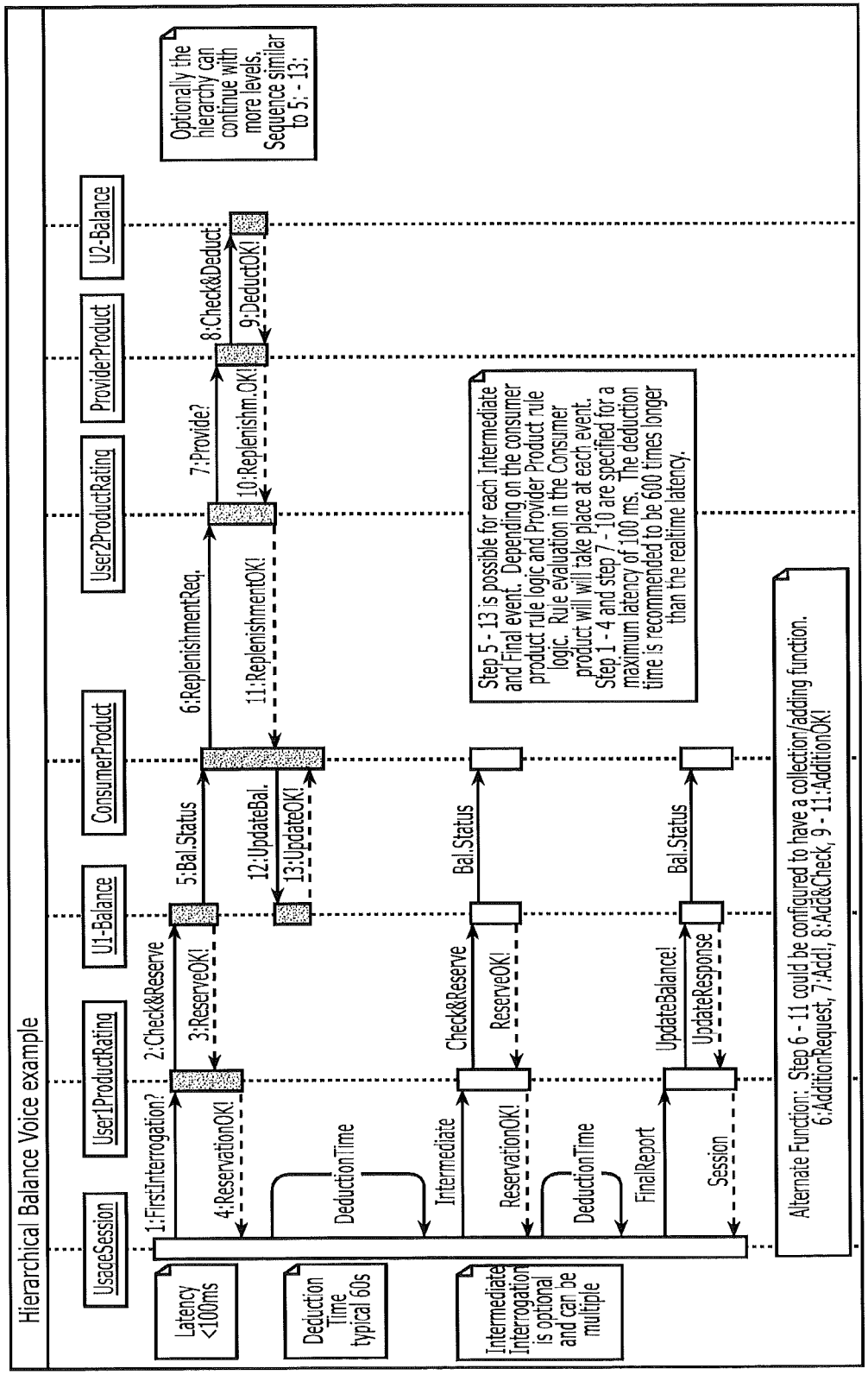

FIG. 9 is a flow diagram illustrating operations of charging systems according to some embodiments. The columns and operations of FIG. 9 are the same as those discussed above with respect to claim 8. In FIG. 9, the action Bal.Status is provided for each intermediate charging reservation and final report.

In the above-description of various embodiments of the present invention, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instruction's may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

What is claimed is:

1. A method providing charging control for a charging controlled service accessed by a terminal in a communication network using a first account having a first account balance associated with the terminal, the method comprising:

receiving a first request for a charging reservation relating to the first account balance associated with the terminal;

responsive to the first request for a charging reservation and responsive to a first status of the first account balance, reserving a first consumer deduction amount from the first account balance in a reservation balance associated with the terminal to allow the charging controlled service for the terminal based on the reservation balance associated with the terminal;

while allowing the charging controlled service for the terminal based on the first consumer deduction amount reserved from the first account balance in the reservation balance, generating a replenishment request directed to a second account balance responsive to a second status of the first account balance;

responsive to the replenishment request, deducting a replenishment amount from the second account balance wherein the replenishment amount represents a quantity of communication service;

updating the first account balance based on the replenishment amount deducted from the second account balance;

after updating the first account balance, receiving a second request for a charging reservation relating to the first account balance associated with the terminal; and responsive to the second request for a charging reservation and responsive to a third status of the first account balance, reserving a second consumer deduction amount from the first account balance in the reservation balance associated with the terminal to allow the charging controlled service for the terminal based on the reservation balance associated with the terminal;

wherein the quantity of communication service represents a first quantity of communication service, wherein each of the first and second consumer deduction amounts represents a second quantity of communication service, and wherein the first quantity of communication service is greater than the second quantity of communication service.

2. The method of claim 1 further comprising:
responsive to the replenishment request directed to the second account balance, verifying that the first account balance is authorized for replenishment from the second account balance,
wherein deducting the replenishment amount comprises deducting the replenishment amount responsive to verifying that the first account balance is authorized.

3. The method of claim 1 further comprising:
responsive to the first request for a charging reservation and responsive to a first status of the first account balance, deducting the first consumer deduction amount from the first account balance; and
responsive to deducting the first consumer deduction, determining that the first account balance is less than a replenishment threshold;
wherein generating the replenishment request comprises generating the replenishment request responsive to determining that the first account balance is less than the replenishment threshold.

4. The method of claim 1, the method further comprising:
before generating the replenishment request directed to a second account balance, consuming communication service by using the charging controlled service between the network and the terminal based on the reservation balance associated with the terminal.

5. The method of claim 4, further comprising:
responsive to termination of using the charging controlled service, updating the first account balance based on the reservation balance.

6. The method of claim 1 further comprising:
responsive to the replenishment request directed to the second account balance, determining the first quantity of communication service for the replenishment amount to be deducted based on the first account for which the replenishment request was generated.

7. The method of claim 6 further comprising:
responsive to determining the first quantity of communication service, determining that the second account balance is sufficient to cover the first quantity of communication service,
wherein deducting the replenishment amount comprises deducting the replenishment amount responsive to determining that the second balance is sufficient.

8. The method of claim 1 wherein the terminal comprises a first terminal, the method further comprising:
allowing communication between the network and a second terminal based on the second account balance.

9. The method of claim 1 wherein the first and second quantities of communication service comprise first and second quantities of time and/or data allowed for communication.

10. The method of claim 1 further comprising:
responsive to a status of the second account balance, generating a second replenishment request directed to a third account balance;
responsive to the second replenishment request, deducting a second replenishment amount from the third account balance wherein the second replenishment amount represents a second quantity of communication service; and
updating the second account balance based on the second replenishment amount deducted from the third account balance.

11. The method of claim 1 wherein generating the replenishment request, deducting the replenishment amount, updating the first account balance, receiving the second request, and reserving the second consumer deduction amount occur during a communication session using the charging controlled service.

12. A method providing charging control for a charging controlled service accessed by a terminal in a communication network using a first account having a first account balance associated with the terminal, the method comprising:
receiving a first request for a charging reservation relating to the first account balance associated with the terminal;
responsive to the first request for a charging reservation and responsive to a first status of the first account balance, reserving a first consumer deduction amount from the first account balance in a reservation balance associated with the terminal to allow the charging controlled service for the terminal based on the reservation balance associated with the terminal;
while allowing the charging controlled service for the terminal based on the first consumer deduction amount reserved from the first account balance in the reservation balance, generating a replenishment request directed to a second account balance responsive to a second status of the first account balance;
responsive to the replenishment request, deducting a replenishment amount from the second account balance wherein the replenishment amount represents a quantity of communication service;
updating the first account balance based on the replenishment amount deducted from the second account balance;
after updating the first account balance, receiving a second request for a charging reservation relating to the first account balance associated with the terminal;
responsive to the second request for a charging reservation and responsive to a third status of the first account balance, reserving a second consumer deduction amount from the first account balance in the reservation balance associated with the terminal to allow the charging controlled service for the terminal based on the reservation balance associated with the terminal; and
responsive to reserving the first consumer deduction amount in the reservation balance associated with the terminal, verifying that the second account balance is available to replenish the first account balance,
wherein generating the replenishment request comprises generating the replenishment request responsive to verifying that the second account balance is available for replenishment.

13. The method of claim 12, wherein the quantity of communication service represents a first quantity of communication service, wherein each of the first and second consumer deduction amounts represents a second quantity of communication service, and wherein the first quantity of communication service is greater than the second quantity of communication service.

14. A charging system in a communications network, the charging system comprising:
an account database including a first account defining a first account balance associated with a terminal configured for communication using a charge controlled service provided by the network and a second account defining a second account balance; and
a charging processor coupled to the account database, wherein the charging processor is configured to receive a first request for a charging reservation relating to the first account balance associated with the terminal, to reserve a first consumer deduction amount from the first account balance in a reservation balance associated with the terminal to allow the charging controlled service for the terminal based on the reservation balance associated with the terminal responsive to the first request for a charging reservation and responsive to a first status of the first account balance, to generate a replenishment request directed to a second account balance responsive to a second status of the first account balance while allowing the charging controlled service for the terminal based on the first consumer deduction amount reserved from the first account balance in the reservation balance, to deduct a replenishment amount from the second account balance responsive to the replenishment request wherein the replenishment amount represents a quantity of communication service, to update the first account balance based on the replenishment amount deducted from the second account balance, to receive a second request for a charging reservation relating to the first account balance associated with the terminal after updating the first account balance, and to reserve a second consumer deduction amount from the first account balance in the reservation balance associated with the terminal to allow the charging controlled service for the terminal based on the reservation balance associated with the terminal responsive to the second request for a charging reservation and responsive to a third status of the first account balance;

wherein the quantity of communication service represents a first quantity of communication service, wherein each of the first and second consumer deduction amounts represents a second quantity of communication service, and wherein the first quantity of communication service is greater than the second quantity of communication service.

15. The charging system of claim 14 wherein the charging processor is further configured to verify that the first account balance is authorized for replenishment from the second account balance responsive to the replenishment request directed to the second account balance, wherein the charging processor is configured to deduct the replenishment amount responsive to verifying that the first account balance is authorized.

16. The charging system of claim 14 wherein the charging processor is further configured to deduct the first consumer deduction amount from the first account balance responsive to the first request for a charging reservation and responsive to a first status of the first account balance, to determine that the first account balance is less than a replenishment threshold responsive to deducting the first consumer deduction, and to generate the replenishment request responsive to determining that the first account balance is less than the replenishment threshold.

17. The charging system of claim 14 further comprising:
a charging client coupled to the charging processor wherein the charging client is configured to consume communication service by using the charging controlled service between the network and the terminal based on the reservation balance associated with the terminal before generating the replenishment request directed to a second account balance.

18. The charging system of claim 17 wherein the charging processor is further configured to update the first account balance based on the reservation balance responsive to termination of using the charging controlled service.

19. The charging system of claim 14 wherein the charging processor is further configured to determine the first quantity of communication service for the replenishment amount to be deducted based on the first account for which the replenishment request was generated responsive to the replenishment request directed to the second account balance.

20. The charging system of claim 14 wherein the charging processor is configured to generate the replenishment request, deduct the replenishment amount, update the first account balance, receive the second request, and reserve the second consumer deduction amount during a communication session using the charging controlled service.

21. A charging system in a communications network, the charging system comprising:
an account database including a first account defining a first account balance associated with a terminal configured for communication using a charge controlled service provided by the network and a second account defining a second account balance; and
a charging processor coupled to the account database, wherein the charging processor is configured to receive a first request for a charging reservation relating to the first account balance associated with the terminal, to reserve a first consumer deduction amount from the first account balance in a reservation balance associated with the terminal to allow the charging controlled service for the terminal based on the reservation balance associated with the terminal responsive to the first request for a charging reservation and responsive to a first status of the first account balance, to generate a replenishment request directed to a second account balance responsive to a second status of the first account balance while allowing the charging controlled service for the terminal based on the first consumer deduction amount reserved from the first account balance in the reservation balance, to deduct a replenishment amount from the second account balance responsive to the replenishment request wherein the replenishment amount represents a quantity of communication service, to update the first account balance based on the replenishment amount deducted from the second account balance, to receive a second request for a charging reservation relating to the first account balance associated with the terminal after updating the first account balance, and to reserve a second consumer deduction amount from the first account balance in the reservation balance associated with the terminal to allow the charging controlled service for the terminal based on the reservation balance associated with the terminal responsive to the second request for a charging reservation and responsive to a third status of the first account balance;
wherein the charging processor is further configured to verify that the second account balance is available to replenish the first account balance responsive to reserving the first consumer deduction amount in the reservation balance associated with the terminal, wherein the charging processor is configured to generate the replenishment request responsive to verifying that the second account balance is available for replenishment.

22. The charging system of claim 21, wherein the quantity of communication service represents a first quantity of communication service, wherein each of the first and second consumer deduction amounts represents a second quantity of communication service, and wherein the first quantity of communication service is greater than the second quantity of communication service.

* * * * *